(12) United States Patent
Diachina et al.

(10) Patent No.: US 8,837,377 B2
(45) Date of Patent: *Sep. 16, 2014

(54) INTER-DOMAIN COORDINATION FOR MT AND MO CALLS

(71) Applicant: Telefonaktiebolaget L M Ericsson (Publ), Stockholm (SE)

(72) Inventors: John Diachina, Garner, NC (US); Jari Vikberg, Järna (SE); Peter Östrup, Linköping (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/951,308

(22) Filed: Jul. 25, 2013

(65) Prior Publication Data

US 2014/0038614 A1     Feb. 6, 2014

Related U.S. Application Data

(63) Continuation of application No. 12/808,826, filed as application No. PCT/IB2008/003589 on Dec. 19, 2008, now Pat. No. 8,520,596.

(60) Provisional application No. 61/008,251, filed on Dec. 19, 2007.

(51) Int. Cl.
| | |
|---|---|
| *H04W 4/00* | (2009.01) |
| *H04W 36/14* | (2009.01) |
| *H04W 60/04* | (2009.01) |
| *H04W 68/12* | (2009.01) |
| *H04W 92/02* | (2009.01) |

(52) U.S. Cl.
CPC .............. *H04W 36/14* (2013.01); *H04W 60/04* (2013.01); *H04W 68/12* (2013.01); *H04W 92/02* (2013.01)
USPC ........................................................ 370/328

(58) Field of Classification Search
None
See application file for complete search history.

(56) References Cited

U.S. PATENT DOCUMENTS

| 6,081,723 | A | 6/2000 | Mademann | |
|---|---|---|---|---|
| 8,520,596 | B2 * | 8/2013 | Diachina et al. | .............. 370/328 |
| 2010/0080171 | A1 | 4/2010 | Rune et al. | |
| 2011/0274046 | A1 | 11/2011 | Rune et al. | |

OTHER PUBLICATIONS

NTT DoCoMo, Location Update for 3G Fallback, S2-074383, 3GPP, Oct. 12, 2007, the whole document.
Ericsson, S1-flex, S2-074101, 3GPP, Oct. 12, 2007, the whole document.
Ericsson, Fallback from eUTRAN to 2G/3G access for CS Voice Services, S2-073863, 3GPP, Aug. 31, 2007, the whole document.

(Continued)

*Primary Examiner* — Kevin C Harper

(57) ABSTRACT

A mobility management entity (MME) for setting up a call includes a first network interface which receives a tracking area update (TAU) request from a user equipment (UE). The MME includes a processing unit which translates the TAU request into a location area update (LAU) request. The MME includes a second network interface in communication with the processing unit which sends the LAU request to a mobile switching center (MSC) selected as a tracking MSC thereby establishing the MME as a network node through which the UE is paged.

18 Claims, 5 Drawing Sheets

(56) References Cited

OTHER PUBLICATIONS

NTT DoCoMo, 2G/3G Fallback: Combined TA/LA Update and Mobile Terminating Call, S2-075256, 3Gpp, Nov. 16, 2007, the whole document.
Notice of Reasons for Rejection for the Japanese Patent Application No. 2010-538943 dated Feb. 26, 2013, 2 pages.
Partnership Project; Technical Specification Group Services and System Aspects; GPRS enhancements for UTRAN access; (Release 8)"3rd Generation Partnership Project (3GPP); Technical Specification (TS)" [Online] No. TS 23.401 VI. 3.0, Oct. 1, 2007, XPOO2487205 Retrieved from the Internet: RL:http://www.3gpp.org/ftp/Specs/archive/23_series/23.401/23401-130.zip> [retrieved on Oct. 24, 2007] chapter 5.3.3 "Tracking Area Update procedures" Annex C.3 "Interoperation procedures", pp. 1-136.

* cited by examiner

INTER-DOMAIN COORDINATION FOR MT AND MO CALLS

CROSS REFERENCE TO RELATED APPLICATIONS

This application is a continuation of U.S. patent application Ser. No. 12/808,826, filed on Jun. 17, 2010, which claims the benefit of PCT Application No. PCT/IB2008/003589 filed on Dec. 19, 2008, which claims the benefit of U.S. Provisional Patent Application No. 61/008,251, filed Dec. 19, 2007, the entire contents of which are incorporated by reference herein.

TECHNICAL FIELD

The present invention is related to the transition of wireless user equipment (UE) from an LTE network to a GSM or UMTS network when a need for call establishment is first detected. (As used herein, references to the "present invention" or "invention" relate to exemplary embodiments and not necessarily to every embodiment encompassed by the appended claims.) More specifically, the present invention is related to the transition of a UE from an LTE network to a GSM or UMTS network when a need for call establishment is first detected for a UE operating in a given LTE cell either in idle mode or with one or more ongoing packet data services (all non speech) where the LTE network or the UE does not support the IP Multi-media Subsystem control plane functionality for call establishment.

BACKGROUND

This section is intended to introduce the reader to various aspects of the art that may be related to various aspects of the present invention. The following discussion is intended to provide information to facilitate a better understanding of the present invention. Accordingly, it should be understood that statements in the following discussion are to be read in this light, and not as admissions of prior art.

The scenario of interest is where a UE (User Equipment) is operating in a given LTE (Long Term Evolution) cell either in idle mode or with one or more ongoing packet data services (all non-speech) where the LTE network or the UE does not support the IP Multi-media Subsystem (IMS) control plane functionality for call establishment. The lack of IMS support for call establishment means that whenever a call (i.e. speech) needs to be established the UE must stop being served by the LTE network and start being served by a GSM or UMTS network for the purpose of performing the control plane signaling required for establishing the call. In other words, unless a transition from the LTE network to a GSM or UMTS network occurs when the need for call establishment is first detected, it will not be possible to set up the call.

BRIEF SUMMARY OF THE INVENTION

The present invention pertains to a mobility management entity (MME) for setting up a call. The MME comprises a first network interface which receives a tracking area update (TAU) request from a user equipment (UE). The MME comprises a processing unit which translates the TAU request into a location area update (LAU) request. The MME comprises a second network interface in communication with the processing unit which sends the LAU request to a mobile switching center (MSC) selected as a tracking MSC thereby establishing the MME as a network node through which the UE is paged. The second network interface receiving a LAU response from the tracking MSC that comprises at least information identifying one or more suitable location area identifiers (LAI(s)) to which handover is allowed and Network Resource Identifier (NRI) information, where the information indicates that the tracking MSC controls the suitable LAI(s), and the processing unit translating the LAU response into a TAU response which is sent through the first network interface to the UE.

The present invention pertains to a method for a mobility management entity (MME) for setting up a call. The method comprises the steps of receiving a tracking area update (TAU) request from a user equipment (UE). There is the step of translating the TAU into a location area update (LAU) request. There is the step of sending the LAU request to a mobile switching center (MSC) selected as a tracking MSC. There is the step of receiving a LAU response from the tracking MSC that comprises at least information identifying one or more suitable location area identifiers (LAI(s)) to which handover is allowed and Network Resource Identifier (NRI) information, where the information indicates that the tracking MSC controls the suitable LAI(s).

The present invention pertains to a method for a user equipment (UE). The method comprises the steps of sending a tracking area update (TAU) request to a mobility management entity (MME). There is the step of receiving a TAU response having suitable location area identifiers (LAIs) and TMSI/NRI; and storing the suitable LAIs and TMSI/network resource identifier (NRI).

The present invention pertains to a user equipment (UE). The UE comprises a processing unit which produces a tracking area update (TAU) request. The UE comprises a network interface in communication with the processing unit which sends the TAU request to a mobility management entity (MME), and receives a TAU response having suitable location area identifiers (LAIs) and TMSI/network resource identifier (NRI). The UE comprises a memory in communication with the network interface which stores the suitable LAIs and TMSI/NRI.

BRIEF DESCRIPTION OF THE DRAWINGS

In the accompanying drawings, the preferred embodiment of the invention and preferred methods of practicing the invention are illustrated in which.

DETAILED DESCRIPTION

Figure 1:
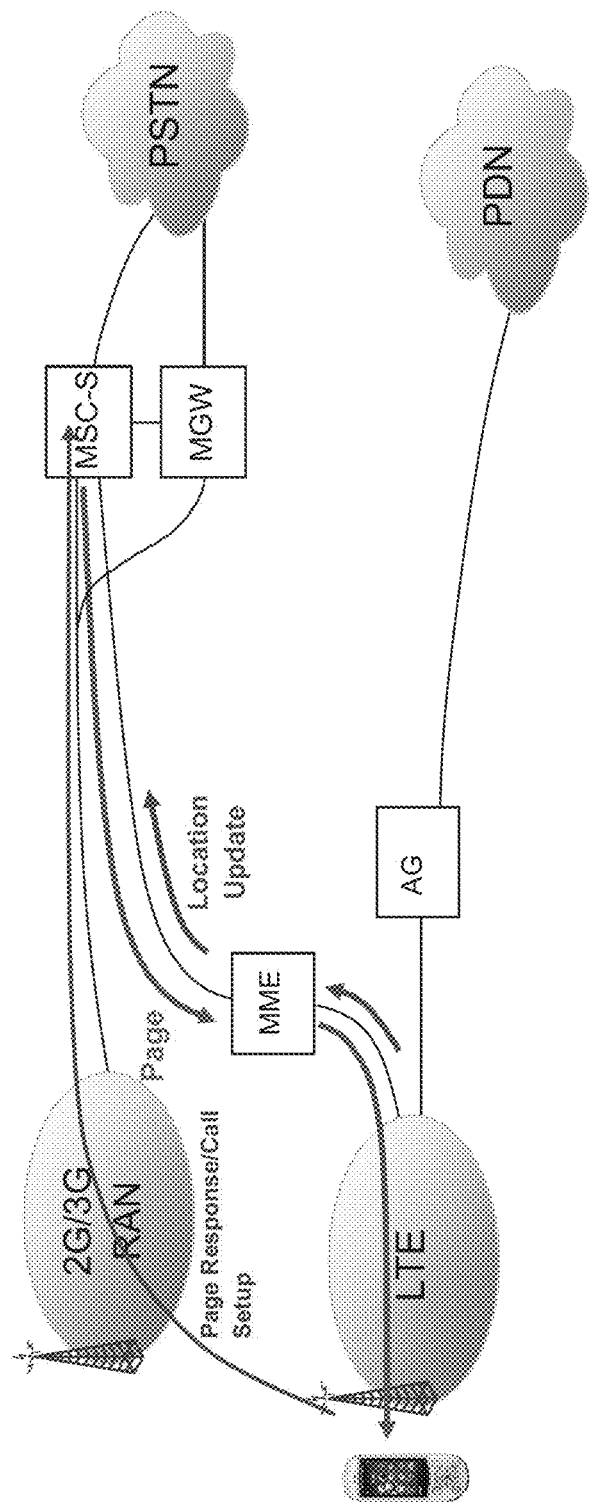
FIG. 1 shows an Inter-Domain Page—Page Response Procedure.
Figure 5:
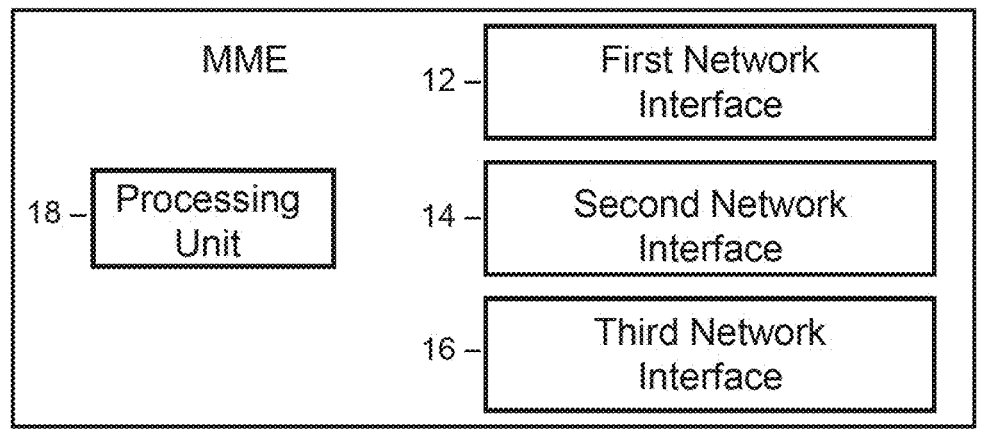
FIG. 5 is a block diagram of an MME of the present invention.

Referring now to the drawings wherein like reference numerals refer to similar or identical parts throughout the several views, and more specifically to FIGS. 1 and 5 thereof, there is shown a mobility management entity (MME) for setting up a call. The MME comprises a first network interface 12 which receives a tracking area update (TAU) request from a user equipment (UE). The MME comprises a processing unit 18 which translates the TAU request into a location area update (LAU) request. The MME comprises a second network interface 14 in communication with the processing unit 18 which sends the LAU request to a mobile switching center (MSC) selected as a tracking MSC thereby establishing the MME as a network node through which the UE is paged. The second network interface 14 receiving a LAU response from the tracking MSC that comprises at least information identifying one or more suitable location area identifiers (LAI(s)) to which handover is allowed and Network Resource Identifier (NRI) information, where the information indicates that the tracking MSC controls the suitable LAI(s), and the processing unit 18 translating the LAU response into a TAU response which is sent through the first network interface 12 to the UE.

The processing unit 18 can use a target 2G/3G cell selected by an evolved NodeB (eNB) for handover which belongs to at least one of the LAIs indicated by the suitable LAIs information. The first network interface 12 can forward the suitable LAIs information to the eNB controlling the LTE cell in which the UE is currently idle or active and further conveying this information to the UE during the control plane message exchange it performs with the eNB prior to the handover preparation phase being triggered if not conveyed from the MME to the UE during the TAU procedure.

The first network interface 12 can forward an NRI information to the eNB controlling the LTE cell in which the UE is currently idle or active and further conveying this information to the UE during the control plane message exchange the UE performs with the eNB prior to the handover preparation phase being triggered if not conveyed to the UE from the MME during the TAU procedure or in the Handover from E-UTRAN command it receives from the eNB. The processing unit 18 can proceed with the handover preparation phase triggered by the eNB when the first network interface 12 receives a Relocation Required message from the eNB wherein a specific target 2G/3G cell is identified.

There can be a third network interface 16 wherein the processing unit 18 maps the Relocation Required message into a Forward Relocation Request message and the third network interface 16 sends it to an SGSN associated with the 2G/3G cell to which the handover will be attempted. The third network interface 16 can receive the Forward Relocation Response from the SGSN. The first network interface 12 can send the Relocation Command to the eNB. The MME can be the LTE network node through which the UE may be paged wherein the second network interface 14 receives a corresponding circuit switched (CS) page from the tracking MSC which then immediately forwards the CS Page to one or more eNBs when, at any point following a successful LAU procedure for a given UE, the tracking MSC detects the need to terminate a voice call for that UE. The first network interface 12 can send the CS Page to one or more eNBs which causes each eNB receiving a CS Page to attempt control plane message exchange with the UE to determine which eNB is actually serving the UE and the serving eNB to convey NRI information to the UE during the control plane message exchange the UE performs with the serving eNB immediately following eNB reception of the CS Page and prior to the handover preparation phase being triggered if not conveyed to the UE from the MME during the TAU procedure or within the Handover from E-UTRAN command the UE subsequently receives during the handover execution phase.

The present invention pertains to a method for a mobility management entity (MME) for setting up a call. The method comprises the steps of receiving a tracking area update (TAU) request from a user equipment (UE). There is the step of translating the TAU into a location area update (LAU) request. There is the step of sending the LAU request to a mobile switching center (MSC) selected as a tracking MSC. There is the step of receiving a LAU response from the tracking MSC that comprises at least information identifying one or more suitable location area identifiers (LAI(s)) to which handover is allowed and Network Resource Identifier (NRI) information, where the information indicates that the tracking MSC controls the suitable LAI(s).

A target 2G/3G cell can be selected for handover by an evolved NodeB (eNB) belongs to at least one of the LAIs indicated by the suitable LAIs information. There can be the step of forwarding the suitable LAIs information to the eNB controlling the LTE cell in which the UE is currently idle or active and further conveying this information to the UE during the control plane message exchange it performs with the eNB prior to the handover preparation phase being triggered if not conveyed to the UE during the TAU procedure. There can be the step of forwarding an NRI information to the eNB controlling the LTE cell in which the UE is currently idle or active and further conveying this information to the UE during the control plane message exchange the UE performs with the eNB prior to the handover preparation phase being triggered if not conveyed to the UE from the MME during the TAU procedure or in the Handover from E-UTRAN command it receives from the eNB.

There can be the step of triggering the handover preparation phase by receiving a Relocation Required message from the eNB wherein a specific target 2G/3G cell is identified. There can be the step of mapping the Relocation Required message into a Forward Relocation Request message and sending it to an SGSN associated with the 2G/3G cell to which the handover will be attempted. There can be the step of receiving the Forward Relocation Response from the SGSN.

There can be the step of sending the Relocation Command to the eNB.

Preferably, there is the step of receiving a corresponding circuit switched (CS) page from the tracking MSC which then immediately forwards the CS Page to the eNB when, at any point following a successful LAU procedure for a given UE, the tracking MSC detects the need to terminate a voice call for that UE. There can be the step of sending the CS page to the eNB which causes the eNB to convey NRI information to the UE during a control plane message exchange the UE performs with the eNB immediately following eNB reception of the CS Page and prior to the handover preparation phase being triggered if not conveyed from the MME to the UE during the TAU procedure or within the handover from E-UTRAN command the UE subsequently receives during the handover execution phase.

The present invention pertains to a method for a user equipment (UE). The method comprises the steps of sending a tracking area update (TAU) request to a mobility management entity (MME). There is the step of receiving a TAU response having suitable location area identifiers (LAIs) and TMSI/NRI; and storing the suitable LAIs and TMSI/network resource identifier (NRI).

Figure 6:
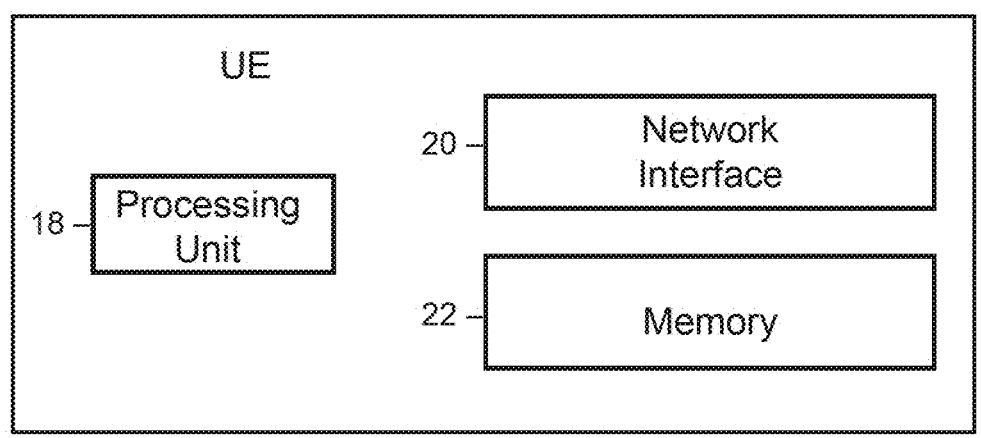
FIG. 6 is a block diagram of the UE of the present invention.

The present invention pertains to a user equipment (UE), as shown in FIG. 6. The UE comprises a processing unit 18 which produces a tracking area update (TAU) request. The UE comprises a network interface 20 in communication with the processing unit 18 which sends the TAU request to a mobility management entity (MME), and receives a TAU response having suitable location area identifiers (LAIs) and TMSI/network resource identifier (NRI). The UE comprises a memory 22 in communication with the network interface 20 which stores the suitable LAIs and TMSI/NRI.

The present invention pertains to a telecommunications system. The system comprises a long term evolution and system architecture evolution (LTE/SAE) network having one or more mobility management entities (MMEs) and one or more LTE cells. The system comprises a User Equipment (UE) operating in a serving LTE cell without the ability to use IP Multimedia Core Network Subsystem (IMS) based call establishment signaling due to lack of UE support or LTE/SAE network support for IMS or due to the UE choosing not to use IMS when it is supported by both the UE and the LTE/SAE network, where the UE may be idle or operating one or more ongoing non-speech PS domain data services. The system comprises a GSM/UMTS system having a mobile switching center (MSC) which tracks the UE's location in the circuit switched (CS) domain by considering the serving LTE cell in which the UE operates to be a logical GSM/EDGE Radio Access Network (GERAN) cell or Universal Terrestrial Radio Access Network (UTRAN) cell and which supports actual GERAN or UTRAN cells that provide radio coverage that overlaps the serving LTE cell, a mobile terminated (MT) voice call being triggered in the CS domain of the GSM/UMTS system resulting in the tracking MSC, which already knows the MME through which the UE may be paged, sending a CS page to that MME in the LTE/SAE network, the reception of a CS page by the MME triggering the LTE/SAE network to perform a packet switched (PS) handover of the UE to a target GERAN/UTRAN cell within the overlaid GSM/UMTS system where the target GERAN/UTRAN cell is determined by the evolved NodeB (eNB) using suitable location area identifiers (LAIs) information and using measurement information or preferred candidate target cell information received from the UE. The transmission of a handover command sent to the UE in the LTE cell that includes the assignment of a CS radio resource as well as PS radio resources, the UE then moving to the GERAN/UTRAN cell indicated by the handover command and completing the handover using PS domain handover procedures, sending a Page Response to the tracking MSC that initially sent the CS Page to the MME, the UE then using the assigned CS radio resource to perform MT call setup signaling with the GSM/UMTS system as necessary to complete MT call setup and entering into conversation with a calling party.

A location area update (LAU) can be sent from the MME to the tracking MSC is triggered by the UE first performing tracking area update (TAU) signaling with the MME where each TAU signaling message may actually be a LAU signaling message tunneled transparently through the eNB to the MME. The MSC can include suitable LAIs information and the Network Resource Identifier (NRI) information in a LAU response sent to the MME. The MSC can send a CS Page to the MME and includes the NRI therein.

The eNB can trigger a control plane message exchange procedure with the UE in the LTE cell following eNB reception of a CS Page from the MME indicating that a voice call needs to be established in the GERAN/UTRAN CS domain, whereby the control plane message exchange allows the UE to indicate to the eNB a set of one or more desired target GERAN/UTRAN cells, target cell measurement information and potentially suitable LAIs information the UE received during the last TAU where the Suitable LAIs information is omitted if the eNB has already retained such information as a result of the last TAU performed by the UE. The eNB, as a result of completing the control plane message exchange with the UE, can trigger the preparation phase of the handover procedure using the target cell ID of a specific 2G cell (i.e. a GERAN cell) or 3G cell (i.e. a UTRAN cell) to which handover is desired where the eNB determines the target cell ID using candidate target cell information provided by the UE, measurement information provided by the UE and suitable LAIs information.

The UE, upon performing a control plane message exchange with the eNB, is in idle mode or has one or more ongoing non-speech PS domain data services, is performing background measurements of candidate 2G/3G cells and provides the eNB with this measurement information, suitable LAIs information (if not already retained by the eNB a result of a previous TAU performed by that UE) and candidate target 2G/3G cell ID information needed to trigger the handover preparation phase. The eNB can be configured to allow for only a single 2G/3G cell to be associated with a coverage area served by any given LTE cell even though the UE can choose to provide the eNB with cell ID information for more than one candidate target 2G/3G cell. The eNB, upon completion of the handover preparation phase, can trigger an execution phase by sending the UE a Handover from E-UTRAN command that identifies the required PS and CS resources to be used in the target 2G/3G cell.

The suitable LAIs information and the NRI information can be stored in the eNB with the NRI being further conveyed to the UE during the control plane message exchange it performs with the eNB prior to the handover preparation phase being triggered if not conveyed from the MME to the UE during the TAU procedure or in the Handover from E-UTRAN command it receives from the eNB. After completing the handover to the target 2G/3G cell using the radio information and PS resources provided by the Handover from E-UTRAN command, the UE can trigger MT call establishment signaling in the target cell by using the assigned CS radio resource to send a Page Response message which includes NRI information which is used by the target Radio Network Controller (RNC) or Base Station Controller (BSC) to determine the tracking MSC to which the Page Response will be sent.

The tracking MSC that sent the initial CS Page to the MME can receive the corresponding Page Response message and call setup is then completed with the GSM/UMTS system and resulting in the UE entering into conversation with calling party.

The present invention pertains to a method for a telecommunications node. The method comprises the steps of triggering a mobile terminated (MT) voice call establishment procedure with a user Equipment (UE) in a long term evolution (LTE) cell of an LTE/SAE network having one or more mobility management entities (MMEs). The UE operating in a serving LTE cell without the ability to use IP Multimedia Core Network Subsystem (IMS) based call establishment signaling due to lack of UE support or LTE/SAE network support for IMS or due to the UE choosing not to use IMS when it is supported by both the UE and the LTE/SAE network, where the UE is either idle or operating one or more ongoing non-speech packet switched (PS) domain data services. There is the step of sending a circuit switched (CS) page from a mobile switching center (MSC) of a GSM/UMTS system, which tracks the UE's location in the CS domain and provides 2G/3G cell radio coverage that overlaps the LTE cell, to an appropriate MME through which the UE may be paged. There is the step of receiving the CS page at the MME and forwarding it to one or more evolved NodeBs (eNB). Each eNB receiving a CS Page attempting control plane message exchange with the UE to determine which eNB is actually serving the UE. The serving eNB performing a control plane message exchange with the UE and triggering the preparation phase of a handover procedure using the target cell ID of a specific 2G/3G cell to which handover is desired, where the eNB determines the target cell ID using candidate target cell information provided by the UE, measurement information provided by the UE and suitable location area identifiers (LAIs) information wherein the selected target cell shall have a corresponding LAI that is within the set of LAIs identified by the Suitable LAIs information. There is the step of causing the LTE/SAE network to perform a PS handover of the UE to the overlaid GSM/UMTS system where a handover command sent to the UE involves the assignment of a CS radio resource as well as PS radio resources. There is the step of the UE moving to the target 2G/3G using radio information provided by the handover command, completing the handover procedure using the PS resources also provided by the handover command, sending a Page Response (also known as a Paging Response) to the tracking MSC using assigned CS radio resources. There is the step of completing the call setup with the GSM/UMTS system and resulting in the UE entering into conversation with calling party.

A target 2G/3G cell selected for handover can belong to at least one of the LAIs indicated by the suitable LAIs information. There can be the step of forwarding the suitable LAIs information from the MME to an evolved NodeB (eNB) controlling the LTE cell in which the UE is currently located and further conveying this information to the UE during the control plane message exchange it performs with the eNB prior to the handover preparation phase being triggered if not conveyed from the MME to the UE during the TAU procedure. There can be the step of forwarding an NRI information from the MME to the eNB controlling the LTE cell in which the UE is currently located and further conveying this information to the UE during the control plane message exchange it performs with the eNB prior to the handover preparation phase being triggered if not conveyed from the MME to the UE during the TAU procedure or in the Handover from E-UTRAN command it receives from the eNB.

There can be the step of the eNB triggering the handover preparation phase by sending a Relocation Required message to the MME wherein a specific target 2G/3G cell is identified. There can be the step of the MME mapping the Relocation Required into a Forward Relocation Request message and sending it to an SGSN associated with the 2G/3G cell to which the handover will be attempted. There can be the step of the MME receiving the Forward Relocation Response from the SGSN. There can be the step of the MME sending the Relocation Command to the eNB which maps it into a Handover from E-UTRAN command and sends it to the UE.

At any point following a successful LAU procedure for a given UE, the tracking

MSC can detect the need to terminate a voice call for that UE in which case it then proceeds by sending a corresponding circuit switched (CS) Page to the MME through which the UE may be paged which then immediately forwards the CS Page to one or more eNBs where each eNB receiving a CS Page attempts control plane message exchange with the UE to determine which eNB is actually serving the UE. The serving eNB, after receiving the CS Page from the MME, can convey NRI information to the UE during a control plane message exchange the UE performs with the eNB immediately following reception of the CS Page prior to the handover preparation phase being triggered if not conveyed from the MME to the UE during the TAU procedure or within the Handover from E-UTRAN command the UE subsequently receives during the handover execution phase.

In the operation of the invention, one of the two call establishment scenarios addressed by this invention is the so called mobile terminated (MT) call establishment case where a remote party is attempting to establish a call with a UE being served by an LTE network by taking advantage of the knowledge of the UE location within the LTE network being made available to a GSM or UMTS network. In this case the UE location is being tracked in the circuit-switched (CS) domain via a tracking Mobile Switching Center (MSC) associated with a GSM/UMTS system providing radio coverage that fully overlays the LTE cell. As such, whenever a mobile terminated (MT) voice call is triggered the UE's location will be known to the tracking MSC which will then be able to send a CS Page (i.e. an Inter-RAT Page) to the appropriate MME (Mobility Management Entity) in the LTE network. The CS Page will then trigger the LTE network to perform a packet switched (PS) handover of the UE to the overlayed GSM/UMTS system where the Handover from E-UTRAN command sent to the UE will involve the assignment of a CS radio resource as well as PS radio resources. This procedure is also known as CS fallback. The UE will then move to the target 2G/3G cell and send a Page Response to the tracking MSC using the assigned CS radio resource and the MT call setup will then complete following existing GSM/UMTS MT call setup procedures. This overall procedure is shown in FIG. 1.

Figure 2:
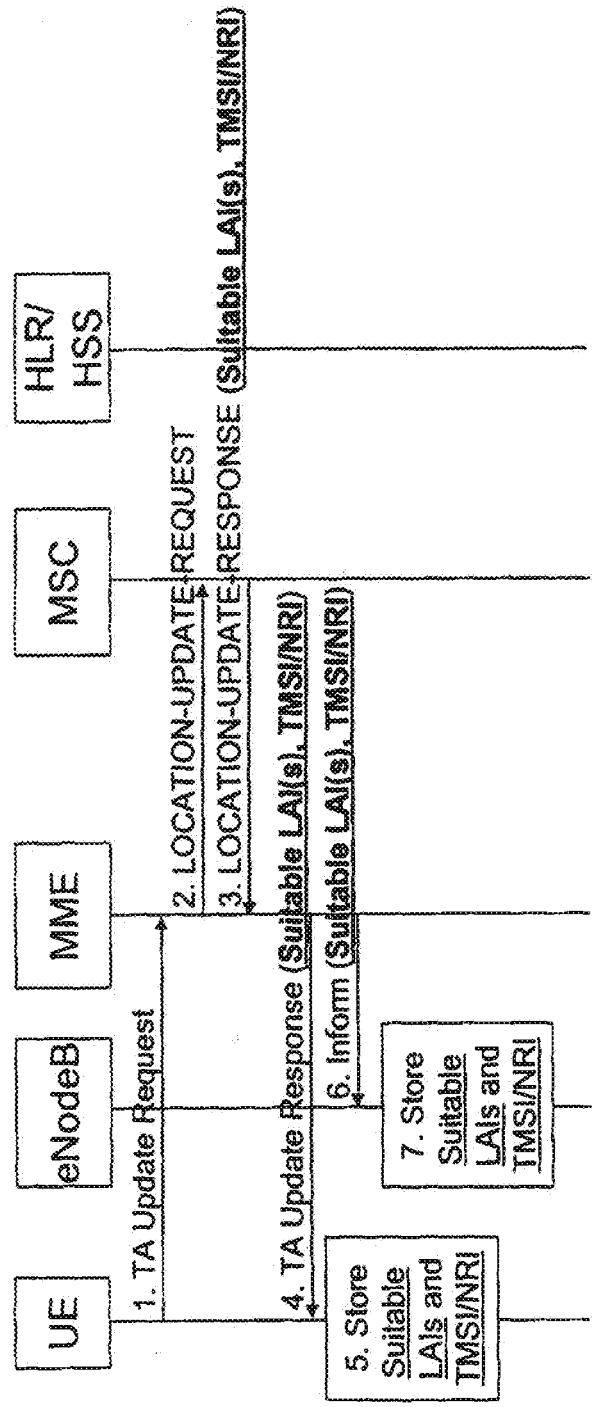
FIG. 2 is a Location Update from the LTE/SAE towards the MSC Procedure.

FIG. 2 shows one possibility for the Location Update procedure towards the tracking MSC from the MME. In this case the Location Update request sent from the MME to the tracking MSC is triggered by the UE performing a Tracking Area Update request. There are also other possibilities for the triggering of the transmission of the Location Update request, but other than recognizing that reception of Location Area Update request by the tracking MSC establishes the sending MME as the LTE network node through which the UE is to be paged, the details of these are not important for the rest of this document. The important part that is shown in FIG. 2 is that the tracking MSC includes in the Location Update Response both the Suitable Location Area Identities (LAIs) information and the Network Resource Identifier (NRI) information. The Suitable LAIs information indicates all the different LAIs that the tracking MSC returning the Location Update Response is controlling. The Suitable LAIs information and the NRI can also be stored in different places as shown in FIG. 2 which indicates that either the eNodeB or the UE may store these for further use such as for Mobile Originated CS Calls (see section 4). Note that The TA Update Request/Response messages may actually be Location Area Update Request/Response messages tunneled transparently through the eNodeB to the MME (in either case message 4 serves as the response to message 1). Message 6 (named as "Inform" in FIG. 2) can be viewed as an optional message which may be sent from the MME for the purpose of conveying Suitable LAIs information and TMSI/NRI information to the eNodeB.

Inter-RAT Page—Page Response Co-ordination Challenge for MT Calls

One challenge that exists when a mobile terminated voice call is to be established by a network that supports "Intra-domain connection of RAN nodes to multiple CN nodes" (see 3GPP TS 23.236) functionality, is that of ensuring that the MSC that sends the CS Page (i.e. an Inter-RAT Page in this case) is the same MSC that eventually receives the Page Response sent by the UE (i.e. after PS handover to the 2G/3G cell in the overlayed GSM/UMTS system) as shown in FIG. 1.

One way to solve this is to have the tracking MSC that sends the CS Page also include the Network Resource Identifier (NRI) in the CS Page request it sends to the MME in the LTE system. In addition, the MSC includes a list of Suitable Location Area Identities (LAIs) in the Page. The NRI uniquely identifies the MSC (in a MSC-pool) that initiated the CS Page and the Suitable LAIs information identifies the set of LAI values within the MSC-Pool for which handover is allowed to be performed and both can be used as follows:

- The Suitable LAIs information contains all the LAIs corresponding to the MSC-Pool of interest such that a target cell selected for handover must belong to at least one of the indicated LAIs. It is also worth noting that the Suitable LAIs concept can be also used in a deployment scenario without MSC-Pool i.e. for Standalone MSCs. In the latter case, the Suitable LAIs information contains all the LAIs belonging to the standalone MSC that triggered the CS Page.
- The Suitable LAIs information is forwarded to the eNodeB controlling the LTE cell in which the UE is currently located within the context of a control plane message (e.g. CS Page). The Suitable LAIs information is used by the eNodeB when it receives measurement information from the UE and selects a target cell for the Inter-Domain handover procedure i.e. only a cell of sufficient signal strength belonging to at least one of the Suitable LAIs information can be selected as the target 2G/3G cell.
- The NRI is also forwarded to the eNodeB controlling the LTE cell in which the UE is currently active within the context of a control plane message (e.g. CS Page) and logically indicates that a voice call needs to be established in the CS domain. This in turn may trigger the eNodeB to solicit measurement information from the UE (e.g. if the most recently received measurement information is not considered current enough).
- Upon determining the target 2G/3G cell (based on the Suitable LAIs information received in the CS Page) in which the UE will be best served the eNodeB triggers the preparation phase of the Inter-Domain Handover procedure and forwards the NRI to the serving SGSN associated with the 2G/3G cell to which Inter-Domain Handover will be attempted.
- The BSC/RNC controlling the target 2G/3G cell is notified of the requested Inter-Domain Handover and the NRI corresponding to the tracking MSC, reserves PS and CS resources in the target 2G/3G, includes NRI in the Inter-Domain Handover Command it constructs and sends to the serving LTE system in the Target to Source Transparent Container (via the serving SGSN).
- The eNodeB includes the Inter-Domain Handover Command in the Handover from E-UTRAN Command message and sends this to the UE in the LTE cell and the UE triggers the Inter-Domain Handover procedure and moves to the 2G/3G cell.
- As part of the Inter-Domain Handover procedure, after arriving in the 2G/3G cell, the UE includes the NRI within information it sends to the BSC/RNC controlling the target 2G/3G cell.
- Since the controlling BSC/RNC may be connected to a whole pool of MSCs (i.e. the MSC in pool feature may be in use), it uses the NRI to look up (i.e. using a lookup table stored in the BSC/RNC) which MSC to send the Page Response to (i.e. the tracking MSC that initially sent the CS Page to the MME).
- Note that for handover to a 2G cell, as soon as the UE completes the PS handover portion of the Inter-Domain Handover procedure (by sending the XID Response message—part of step 12 of FIG. 3) it establishes the main signaling link on the allocated CS resource (i.e. UE sends a SABM containing a layer 3 Service Request message=PAGING RESPONSE to the BSS) and the BSS responds by sending a UA.
- Upon receiving the SABM (containing a PAGING RESPONSE message) the BSS sends a COMPLETE LAYER 3 INFORMATION message (containing a PAGING RESPONSE message) to the tracking MSC that initially sent the Inter-RAT Page which indicates CS resources have been allocated in the GERAN cell.
- The mobile terminated call establishment procedure (signaling) then completes as per legacy operation as described in 3GPP TS 23.108.

As an alternative to sending the NRI to the BSC/RNC controlling the 2G/3G cell of the target system when the preparation phase of the Inter-Domain Handover is triggered, the NRI could be kept in the serving LTE system (E-UTRAN) and added (as a separate information element) to the Handover from E-UTRAN Command message eventually sent to the UE during the execution phase (i.e. after the serving LTE system has received the Inter-Domain Handover Command from the target system within the Target BSS/RNC to Serving BSS/RNC Transparent Container).

Figure 3:
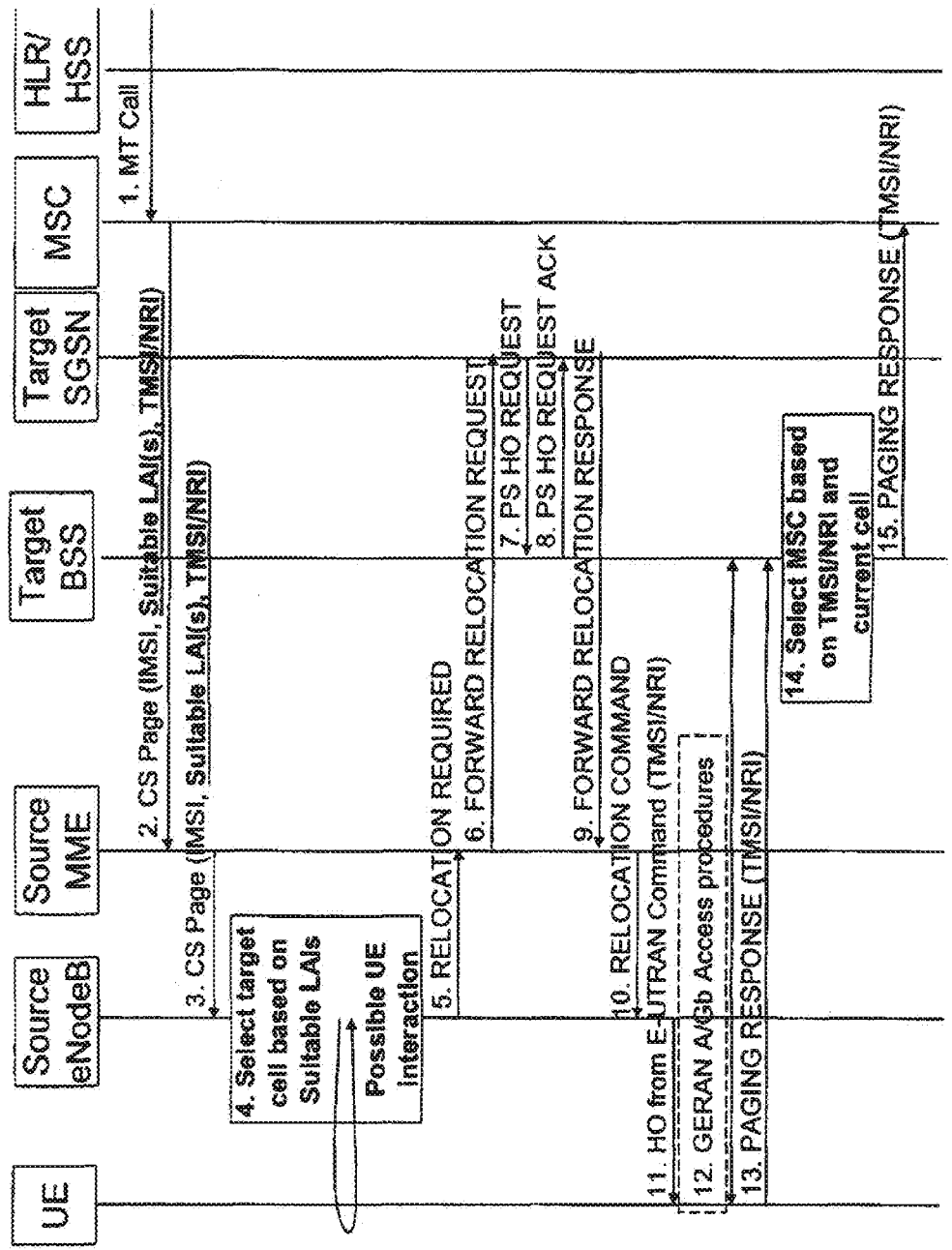
FIG. 3 shows CS Fallback for Mobile terminated call based on the Inter-Domain Handover procedure.

FIG. 3 shows the main steps related to Mobile Terminated call in this case. The prerequisite is that the Location Update procedure as shown in FIG. 2 has been performed towards the tracking MSC wherein the reception of Location Area Update request by the tracking MSC establishes the sending MME as the LTE network node through which the UE is to be paged.

Target 2G/3G Cell Resource Reservation Challenge

The Inter-RAT Page—Page Response co-ordination is only useful if we can also ensure the correct target 2G/3G cell (which of course implies the correct base station controller (BSC) or radio network controller (RNC)) is identified during the preparation phase of the Inter-Domain Handover procedure:

- Upon receiving the notification that a voice call needs to be established in the CS domain, the serving eNodeB triggers a control plane message exchange procedure with the UE in the LTE cell whereby the UE can identify its desired target cell (i.e. the eNodeB controlling the serving LTE cell essentially asks the UE to report its preferred 2G/3G cell or cells). This is needed since multiple 2G/3G cells may in practice provide overlayed coverage for any given LTE cell.
- The Suitable LAIs information can be used in this target cell selection process in different ways. The eNodeB could inform the UE about the Suitable LAIs information and the UE would only report measurement results for 2G/3G cells belonging to the Suitable LAIs information. Another possibility would be that the eNodeB asks the UE to measure and report only on 2G/3G cells belonging to the Suitable LAIs information and then the eNodeB can select the best of these cells. And one more option is for the eNodeB to indicate that an LAI restricted handover is ongoing to ensure that the UE reports multiple cells from which the eNodeB will select the best according to the LAI limitation (i.e. the UE need not have any knowledge of the LAI corresponding to each of its neighbor cells).
- As a result of this control plane message exchange the serving eNodeB can trigger the preparation phase of the Inter-Domain Handover procedure as it will know the Cell ID of the specific target 2G/3G cell to which handover is desired. If the UE has indicated more than one possible candidate target 2G/3G cell the serving eNodeB will use the Suitable LAIs information together with additional information received from the UE (e.g.

signal strength information associated with each candidate target 2G/3G cell) to select a single target 2G/3G cell.

Upon performing this control plane message exchange the UE is in active mode (i.e. it has one or more ongoing PS services) and therefore it may already be performing background measurements of candidate 2G/3G cells and therefore may be able to quickly provide the serving eNodeB with the candidate target 2G/3G cell ID information needed to trigger the Inter-Domain Handover preparation phase. Otherwise, the UE may make additional real time measurements of candidate 2G/3G cells before responding to the request for such candidate 2G/3G cell information it receives from the serving eNodeB during this control plane message exchange procedure.

One way to simplify this process is for the serving eNodeB to be configured to only allow for a single 2G/3G cell to be associated with the coverage area served by any given LTE cell. In this case the control plane message exchange procedure would serve only as an opportunity for the UE to indicate if it prefers Inter-Domain Handover to a 2G cell or a 3G cell. If multiple 2G/3G cells are associated with the coverage area served by any given LTE cell, then the Suitable LAIs information can be used by the eNodeB to select an appropriate target cell.

Upon completion of the Inter-Domain Handover preparation phase the serving eNodeB will trigger the execution phase by sending the UE a Handover from E-UTRAN Command (that includes an Inter-Domain Handover Command) that identifies the required PS and CS resources to be used in the target 2G/3G cell. In addition, for the case of Inter-Domain Handover to a 2G cell, the serving eNodeB will provide the UE with system information (applicable to the target 2G cell) either immediately prior to sending the UE the Handover from E-UTRAN Command or as part of this command.

This process therefore ensures that the UE receives a Handover from E-UTRAN Command that directs it to a target 2G/3G cell that provides acceptable radio coverage to ensure service continuity. After successful completion of the Inter-Domain Handover to a 2G/3G cell, subsequent handovers may be performed (according to legacy procedures) to ensure continued service continuity within the GSM/UMTS service area.

It should be noted that a selection of a tracking MSC must be made so that it serves as the recipient of a Location Area Update request sent by the MME in response to receiving a Tracking Area Update request from a UE being served by a specific LTE cell whereby the reception of the Location Area Update request by the tracking MSC establishes the sending MME as the LTE network node through which the UE is to be paged. This tracking MSC can be selected such that it controls the most (or possibly all) 2G/3G cells that provide overlaying coverage for the LTE cell of concern. This will help ensure that the best overlaying 2G/3G cell from a coverage perspective (and therefore the best target cell for handover purposes) is also a cell associated with an LAI known to the tracking MSC.

Mobile Originated calls

The Mobile Originated call is preferably established using the information stored during the Location Update Procedure (FIG. 2) i.e. the Suitable LAIs information and the NRI. The Suitable LAIs information can also be used in this call case to ensure that the correct target 2G/3G cell is selected during the preparation phase of the Inter-Domain Handover procedure:

Initially, the Suitable LAIs information and the NRI are stored either in the UE or in the eNodeB or in both (i.e. as a result of the Location Update procedure shown in FIG. 2).

Once the UE identifies that the end user wishes to place a Mobile Originated CS Call, the UE indicates this to the eNodeB (e.g. using a control plane message sent using an allocated PS domain radio resource). If the Suitable LAIs information was only stored in the UE, then this information is also passed to the eNodeB from the UE. Then the same mechanisms as described for the MT case are used by the eNodeB to identify the correct target 2G/3G cell, e.g. based on the Suitable LAIs information and optionally measurement reports received from the UE.

When the PS handover portion of the Inter-Domain handover procedure is completed for the case of handover to a 2G cell, the UE will trigger MO call establishment in the target cell by sending the CM Service Request message and includes also the NRI (this is then followed by additional signaling as per the legacy mobile originated call establishment procedure as defined in 3GPP TS 23.108). Since the controlling BSC/RNC may be connected to a whole pool of MSCs (i.e. the MSC in pool feature may be in use), it uses the NRI to look up (i.e. using a lookup table stored in the BSC/RNC) which MSC to send the CM Service Request to.

The tracking MSC that initially received the Location Update for this UE then receives the corresponding CM Service Request and call setup is then completed using legacy procedures associated with a UE originated CS call.

Figure 4:
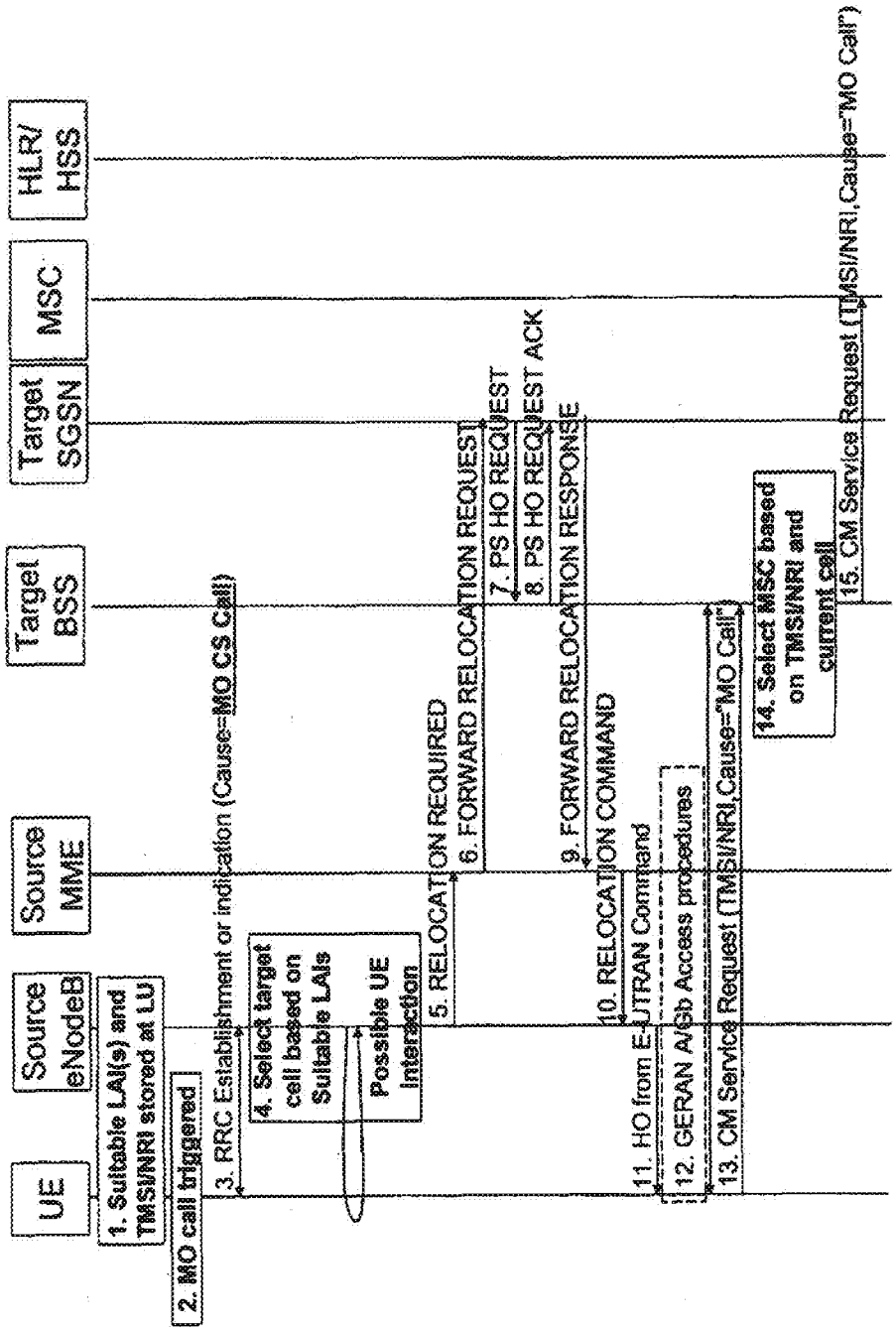
FIG. 4 shows CS Fallback for Mobile originated call based on the Inter-Domain Handover procedure.

FIG. 4 shows the main steps related to Mobile Originating call in the case the Inter-Domain handover procedure is used as the CS Fallback mechanism. It should be noted that additional CS Fallback mechanisms (i.e. other than handover) could alternatively be used for both the MT and MO cases. For example, the Cell Change Order (CCO) mechanism where the UE is ordered to move to a 2G/3G cell without first receiving pre-assigned CS and PS domain resources and must therefore perform contention access procedures in the target 2G/3G cell to acquire these resources. All CS Fallback mechanisms share the key common procedural elements of the TAU, CS domain location tracking by the tracking MSC, CS Page, eNB and UE control plane information exchange prior to triggering cell change, target cell ID selection based on Suitable LAIs information and measurement information provided by the UE, directing the UE to move to the target 2G/3G cell, the UE sending a Page Response in the target 2G/3G cell and finally completing call establishment signaling procedures in the target 2G/3G cell.

By solving both the Inter-RAT Page—Page Response coordination challenge and the target 2G/3G Cell resource reservation challenge as described above, existing 2G/3G procedures for a UE terminated CS call will be re-usable to the maximum extent possible and the UE will be provided with radio resources in a 2G/3G cell that in practice overlays the LTE cell and thereby ensures acceptable post handover radio quality.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A mobility management entity (MME) comprising:
a first network interface which receives a tracking area update (TAU) request from a user equipment (UE);
a processing unit which translates the TAU request into a location area update (LAU) request; and
a second network interface in communication with the processing unit which sends the LAU request to a mobile switching center (MSC) selected as a tracking MSC thereby establishing the MME as the network node through which the tracking MSC will page the UE for subsequent mobile terminated voice calls, the second network interface receiving a LAU response from the tracking MSC that comprises at least information identifying one or more suitable location area identifiers (LAI(s)) to which handover is allowed and Network Resource Identifier (NRI) information, where the NRI information indicates that the tracking MSC controls the suitable LAI(s), and the processing unit translating the LAU response into a TAU response which is sent through the first network interface to the UE; and
the processing unit which triggers handover of the UE to 2G/3G cells in support of mobile terminated voice calls wherein the processing unit uses a target 2G/3G cell selected by an evolved NodeB (eNB) for handover where the target 2G/3G cell belongs to at least one of the LAIs indicated by the suitable LAIs information.

2. The MME as described in claim 1 wherein the first network interface forwards the suitable LAIs information to the eNB controlling the LTE cell in which the UE is currently idle or active and further conveying this information to the UE during the control plane message exchange it performs with the eNB prior to the handover preparation phase being triggered if not conveyed from the MME to the UE during the TAU procedure.

3. The MME as described in claim 2 wherein the first network interface forwards an NRI information to the eNB controlling the LTE cell in which the UE is currently idle or active and further conveying this information to the UE during the control plane message exchange the UE performs with the eNB prior to the handover preparation phase being triggered if not conveyed from the MME to the UE during the TAU procedure or in the Handover from E-UTRAN command it receives from the eNB.

4. The MME as described in claim 1 wherein the processing unit proceeds with the handover preparation phase triggered by the eNB when the first network interface receives a Relocation Required message from the eNB wherein a specific target 2G/3G cell is identified.

5. The MME as described in claim 4 including a third network interface and wherein the processing unit maps the Relocation Required message into a Forward Relocation Request message and the third network interface sends it to an SGSN associated with the target 2G/3G cell to which the handover will be attempted.

6. The MME as described in claim 5 wherein the third network interface receives the Forward Relocation Response from the SGSN.

7. The MME as described in claim 6 wherein the first network interface sends the Relocation Command to the eNB.

8. The MME as described in claim 1 through which the UE may be paged wherein the second network interface receives a corresponding circuit switched (CS) page from the tracking MSC which then immediately forwards the CS Page to one or more eNBs when, at any point following a successful LAU procedure for a given UE, the tracking MSC detects the need to terminate a voice call for that UE.

9. The MME as described in claim 8 wherein the first network interface sends the CS Page to one or more eNBs which causes each eNB receiving a CS Page to attempt control plane message exchange with the UE to determine which eNB is actually serving the UE and the serving eNB to convey NRI information to the UE during the control plane message exchange the UE performs with the serving eNB immediately following eNB reception of the CS Page and prior to the handover preparation phase being triggered if not conveyed from the MME to the UE during the TAU procedure or within the Handover from E-UTRAN command the UE subsequently receives during the handover execution phase.

10. A method for a mobility management entity (MME) for setting up a call comprising the steps of:
receiving a tracking area update (TAU) request from a user equipment (UE);
translating the TAU into a location area update (LAU) request;
sending the LAU request to a mobile switching center (MSC) selected as a tracking MSC thereby establishing the MME as the network node through which the tracking MSC will page the UE for subsequent mobile terminated voice calls; and
receiving a LAU response from the tracking MSC that comprises at least information identifying one or more suitable location area identifiers (LAI(s)) to which handover is allowed and Network Resource Identifier (NRI) information, where the NRI information indicates that the tracking MSC controls the suitable LAI(s); and
triggering handover of the UE to 2G/3G cells in support of mobile terminated voice calls wherein the MME uses a target 2G/3G cell selected by an evolved NodeB (eNB) for handover where the target 2G/3G cell belongs to at least one of the LAIs indicated by the suitable LAIs information.

11. The method as described in claim 10 including the step of forwarding the suitable LAIs information to the eNB controlling the LTE cell in which the UE is currently idle or active and further conveying this information to the UE during the control plane message exchange it performs with the eNB prior to the handover preparation phase being triggered if not conveyed from the MME to the UE during the TAU procedure.

12. The method as described in claim 11 including the step of forwarding an NRI information to the eNB controlling the LTE cell in which the UE is currently idle or active and further conveying this information to the UE during the control plane message exchange the UE performs with the eNB prior to the handover preparation phase being triggered if not conveyed from the MME to the UE during the TAU procedure or in the Handover from E-UTRAN command it receives from the eNB.

13. The method as described in claim 10 including the step of triggering the handover preparation phase by receiving a Relocation Required message from the eNB wherein a specific target 2G/3G cell is identified.

14. The method as described in claim 13 including the step of mapping the Relocation Required message into a Forward Relocation Request message and sending it to an SGSN associated with the 2G/3G cell to which the handover will be attempted.

15. The method as described in claim 14 including the step of receiving the Forward Relocation Response from the SGSN.

16. The method as described in claim 15 including the step of sending the Relocation Command to the eNB.

17. The method as described in claim 10 including the step of receiving a corresponding circuit switched (CS) page from the tracking MSC which then immediately forwards the CS Page to the eNB when, at any point following a successful LAU procedure for a given UE, the tracking MSC detects the need to terminate a voice call for that UE.

18. The method as described in claim 17 including the step of sending the CS page to the eNB which causes the eNB to convey NRI information to the UE during a control plane message exchange the UE performs with the eNB immediately following eNB reception of the CS Page and prior to the handover preparation phase being triggered if not conveyed from the MME to the UE during the TAU procedure or within the handover from E-UTRAN command the UE subsequently receives during the handover execution phase.

* * * * *